(12) United States Patent
Kurokawa et al.

(10) Patent No.: US 6,928,651 B2
(45) Date of Patent: Aug. 9, 2005

(54) INITIALIZATION METHOD OF OPTICAL RECORDING MEDIUM (75) Inventors: Kotaro Kurokawa, Kanagawa (JP); Takeshi Yamasaki, Kanagawa (JP); Tomomi Yukumoto, Chiba (JP); Masanobu Yamamoto, Kanagawa (JP); Daisuke Ueda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/475,070

(22) PCT Filed: Feb. 19, 2003

(86) PCT No.: PCT/JP03/01771
§ 371 (c)(1),
(2), (4) Date: Mar. 15, 2004

(87) PCT Pub. No.: WO03/071525
PCT Pub. Date: Aug. 28, 2003

(65) Prior Publication Data
US 2004/0148622 A1 Jul. 29, 2004

(30) Foreign Application Priority Data
Feb. 22, 2002 (JP) ..................................... 2002-046487

(51) Int. Cl.[7] ................................................. G11B 7/24
(52) U.S. Cl. ..................... 720/718; 369/275.2; 369/288
(58) Field of Search ................. 720/718; 369/275.2, 369/275.5, 121, 116, 283, 47.55; 430/270.13; 428/64.1, 64.4

(56) References Cited

U.S. PATENT DOCUMENTS 6,240,060 B1 * 5/2001 Kikitsu et al. ........... 369/275.1
6,256,286 B1 * 7/2001 Ogawa ........................ 369/116
6,294,310 B1 * 9/2001 Ohno et al. ............. 430/270.13
6,574,180 B2 * 6/2003 Kurokawa et al. ............ 369/94
6,665,245 B1 * 12/2003 Guerra et al. ............. 369/47.55
2002/0018428 A1   2/2002 Kurokawa et al.

FOREIGN PATENT DOCUMENTS

JP          5-159299 A     6/1993
JP       2001-250265 A     9/2001
JP       2002-144736 A     5/2002

* cited by examiner

Primary Examiner—Angel Castro
(74) Attorney, Agent, or Firm—Robert J. Depke; Trexler, Bushnell, Giangiorgi, Blackstone & Marr (57) ABSTRACT An initialization method of an optical recording medium having a plurality of optical recording layers capable of reducing uneven initialization due to light interference caused at the time of initialization without deterioration of information recording/reproducing signal characteristics of the recording layers is provided. An initialization method of an optical recording medium, wherein a second optical recording layer and a first optical recording layer are successively stacked via an interlayer on a substrate, a protective layer is formed further on the first optical recording layer, a recording film in the first optical recording layer comprises a phase change type recording material, and a recording/reproducing light is irradiated from the protective film side at the time of recording/reproducing, a material composing the interlayer has a sufficient transmittance for a wavelength of the recording/reproducing light and absorption for an initializing light, and, in a step of initializing by irradiating an initializing light on the first optical recording layer from the protective film side, laser light having a wavelength range of 200 nm to 400 nm is used as the initializing light.

3 Claims, 11 Drawing Sheets

INITIALIZATION METHOD OF OPTICAL RECORDING MEDIUM

This application claims priority to Japanese Patent Application Number JP2002-046487, filed Feb. 22, 2002, which is incorporated herein by reference.

TECHNICAL FIELD

The present invention relates to an initialization method of an optical recording medium (hereinafter, also referred to as an "optical disk"), more particularly relates to an initialization method of a multilayer optical disk having an optical recording layer using a phase change type material as a recording material.

BACKGROUND ART

In recent years, in the field of information recording, studies on optical information recording methods have been pursued in various places. Such optical information recording methods have advantages of being able to record and reproduce in a noncontact way and deal with read-only type, write-once type, and rewritable type memory systems and are expected to be widely used from industrial use to consumer use as methods capable of realizing inexpensive large-capacity files.

The increasingly large capacity of optical recording media (hereinafter, also referred to as "optical disks") for the above various optical information recording systems has mainly been attained by shortening the wavelength of the laser light serving as the light source used in optical information recording systems and by adopting an objective lens having a high numerical aperture to make the spot size on the focal surface smaller.

For example, in a CD (compact disk), the laser light wavelength is 780 nm, the numerical aperture (NA) of the objective lens is 0.45, and the capacity was 650 MB, while in a DVD-ROM (digital versatile disk read-only memory), the laser light wavelength is 650 nm, the NA was 0.6, and the capacity is 4.7 GB.

Further, for next generation optical disk systems, studies are being made on increasing capacity by using an optical disk formed with a thin light transmitting protective film (cover film) of, for example, 100 $\mu$m or so on an optical recording layer, irradiating laser light for recording/reproduction from the protective film side, making the laser light wavelength 450 nm or less, and making the numerical aperture (NA) of the objective lens 0.78 or more.

Also, in recent years, development of a rewritable type multilayer optical disk using a phase change type recording material and having two optical recording layers has been pursued. Hereinafter, an optical disk having a plurality of optical recording layers will also be referred to as a "multilayer optical disk", while an optical disk having one optical recording layer will also be referred to as a "single layer optical disk".

The present inventors have been engaged in development of a phase change type multilayer optical disk and disclosed results at the Optical Data Storage (ODS) Symposium in 1999 and ODS Symposium in 2001.

A phase change optical disk, whether a single layer optical disk or a multilayer optical disk, requires a process called "initialization" before shipping to the market.

In a production process of a phase change type optical disk, generally, a film of a phase change type recording material is formed on a substrate made of polycarbonate etc. by a sputtering apparatus. In the "as-deposited" stage after forming the film, the phase state of the phase change type recording material is close to an amorphous state.

In a phase change optical disk, when recording information, the phase state of the phase change type recording material is required to be a crystalline state before the recording. The process of changing the amorphous state right after forming the film to the crystalline state is called as the "initialization process".

In the currently widely used initialization apparatus, the entire surface of the optical recording layer is crystallized by focusing laser light on the optical recording layer to be initialized to heat the phase change type recording material and scanning the entire surface of the optical recording layer.

At this time, the beam shape of the laser light focused on the optical recording layer has a beam width of, for example, about 1 $\mu$m in the disk rotation direction and about 100 $\mu$m in the radius direction.

When initializing the optical recording layer on the multilayer optical disk having a phase change type optical recording layer provided as the first layer from the light incident side by using such an initialization apparatus, as described in Japanese laid open patent application (Kokai) No. 2001-250265, it is known that due to light interference generated by uneven thickness of an interlayer between a first optical recording layer and a second optical recording layer, a change of the light intensity of the initializing light occurs on the first recording layer and causes uneven initialization.

Japanese laid open patent application (Kokai) No. 2001-250265 proposes to use a laser of a wavelength near 810 nm and a material of the interlayer having absorption in that wavelength and not having absorption in a wavelength near 400 nm. As an example, it describes to mix a pigment material having absorption in a wavelength near 810 nm into the material of the interlayer.

However, if actually mixing the above pigment material into the material composing the interlayer, the material of the interlayer and the pigment material sometimes interact and absorption occurs at a wavelength near 400 nm.

Figure 1A:
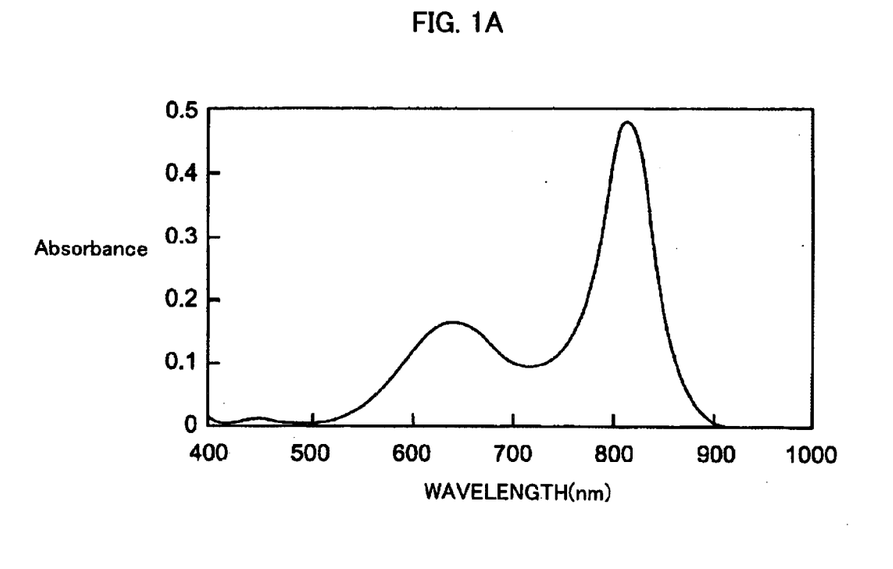
FIG. 1A and FIG. 1B show the light absorption spectrum of the pigment material alone and the light absorption spectrum in the case of mixing the above pigment material into the material of the interlayer according to the prior art.
Figure 1B:
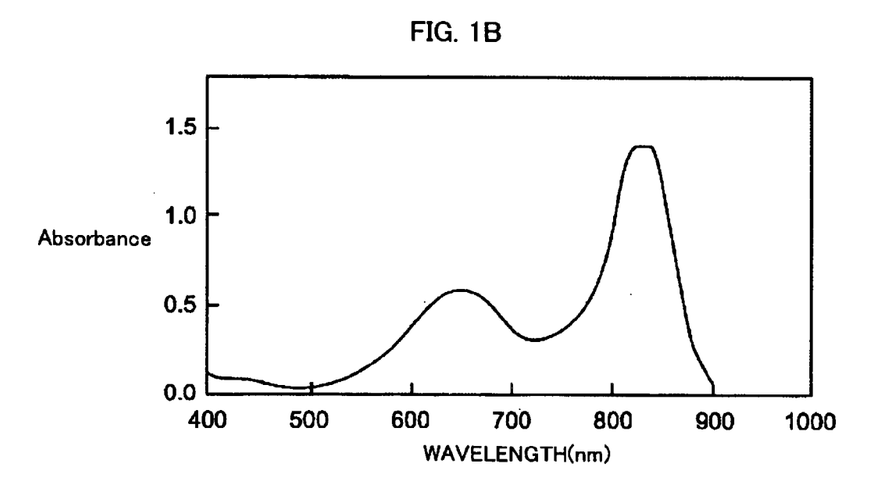

The light absorption spectrum of the above pigment material alone and the light absorption spectrum in case of mixing the above pigment material into the material of the interlayer are shown in FIG. 1A and FIG. 1B. Mechanical properties, thermal properties, and other properties suitable for an optical disk have to be sought from the material of the interlayer in addition to the light absorption properties such as in FIG. 1A.

Development of a material satisfying even the light absorption properties may be achieved with further development work, but is not easy.

DISCLOSURE OF THE INVENTION

The present invention was made in consideration of the above circumstances. Accordingly, an object of the present invention is to provide an initialization method of an optical recording medium capable of reducing uneven initialization due to light interference generated at the time of initialization without deterioration of the information recording/reproducing signal characteristics of the recording layers.

To attain the above object, an initialization method of an optical recording medium according to the present invention is an initialization method of an optical recording medium wherein a second optical recording layer and first optical recording layer are successively stacked on a substrate through an interlayer, a protective layer is formed over the first optical recording layer, a recording film of at least the first optical recording layer has a phase change type recording medium, and recording/reproducing light is irradiated from the protective layer side at the time of recording/reproduction, wherein the material forming the interlayer has a sufficient transmittance with respect to a wavelength of the recording/reproducing light and has an absorption with respect to a wavelength of the initializing light and wherein, in a step of initialization by irradiating initializing light to the first optical recording layer from the protective film side, laser light having a wavelength range of 200 nm to 400 nm is used as the initializing light.

In the above initialization method of an optical recording medium according to the present invention, preferably the initializing light is from an Ar gas laser having a wavelength in the range of 200 nm to 400 nm, and the material composing the interlayer is a polycarbonate resin or another organic material.

In the above initialization method of the optical recording medium of the present invention, in the step of initialization by irradiating initializing light to the first optical recording layer, when focusing a laser serving as the initializing light on the first optical recording layer to be initialized, part of the initializing light irradiated on the optical recording layer to be initialized passes through the first optical recording layer, reaches the second optical recording layer, is reflected at the second optical recording layer, returns to the first optical recording layer, and is irradiated to the first optical recording layer to be initialized.

To reduce the uneven initialization due to the interlayer interference at the time of initialization, the intensity of the return light reflected at the second optical recording layer and returned to the first optical recording layer may be reduced.

Here, if the transmittance of the first optical recording layer and the reflectivity of the second optical recording layer are sufficiently small with respect to the wavelength of the initializing light, it is possible to reduce the uneven initialization due to the light interference between the first and second optical recording layers at the time of initialization.

However, since the optical properties of the first and second optical recording layers are designed for the recording/reproducing wavelength of the multilayer optical disk, the optical properties of the first and second optical recording layers do not necessarily give the above properties for the wavelength of the initializing light.

Therefore, if the material composing the interlayer has a sufficient transmittance for the wavelength of the recording/reproducing light and has absorption for the wavelength of the initializing light so that the light interference between the first and second optical recording layers becomes an extent within a permissible range, the problem of the light interference between the first and the second optical recording layers at the time of initialization can be solved.

The recording/reproducing light used for optical disks reported up until now has a longer wavelength than 400 nm even at the shortest.

Here, investigating the optical properties of the organic materials capable of being used as the material composing the interlayer and having a sufficient transmittance in the visible light range used as the recording/reproducing light, there are many materials having light absorption at a wavelength in the range of 200 to 400 nm.

By utilizing that property, using as the initializing light one of a wavelength in the range of 200 to 400 nm, and using a material having absorption in the wavelength region of the initializing light and having sufficient transmittance for the recording/reproducing light of a wavelength longer than 400 nm, the problem of uneven initialization due to the light interference between the first and second optical recording layers at the time of initialization can be solved.

BRIEF DESCRIPTION OF THE DRAWINGS

FIG. 2A is a schematic perspective view of a state of irradiating light on an optical disk according to an embodiment of the present invention, while

BEST MODE FOR CARRYING OUT THE INVENTION

Below, embodiments of the present invention will be explained in detail by using the drawings.

The present embodiment relates to an initialization method of an optical recording medium (optical disk).

Figure 2A:
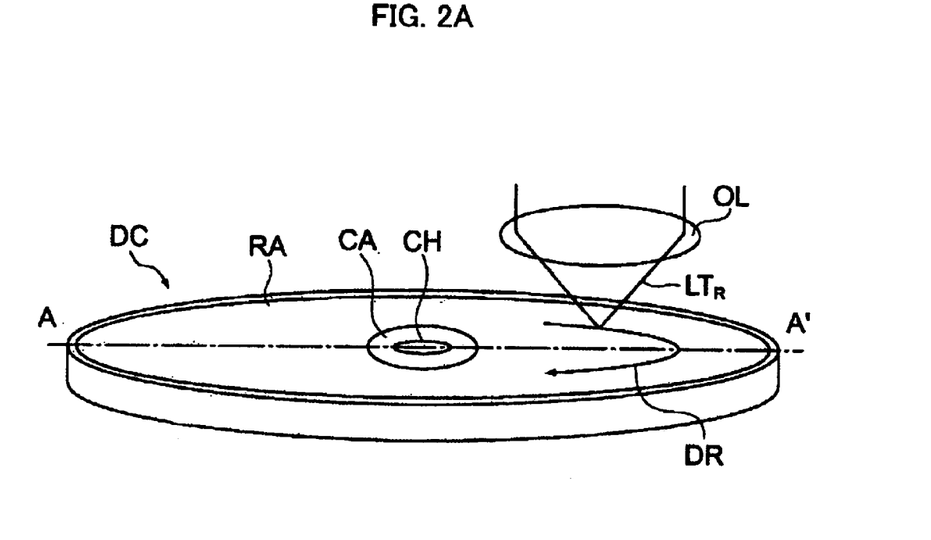

FIG. 2A is a schematic perspective view of a state of irradiating light on an optical disk provided with two optical recording layers according to the present embodiment.

An optical disk DC has an approximate disk shape formed with a center hole CH at the center, has a clamp area CA at its inner circumference portion, is provided with an information recording/reproducing area RA at the outside of that, and is driven to rotate in the drive direction DR.

At the time of recording or reproducing information, the optical recording layer in the optical disk DC is irradiated by recording/reproducing light $LT_R$ comprised of blue to blue-violet region laser light of a wavelength longer than 400 nm from an objective lens OL having a numerical aperture of 0.8 or more for example.

Figure 2B:
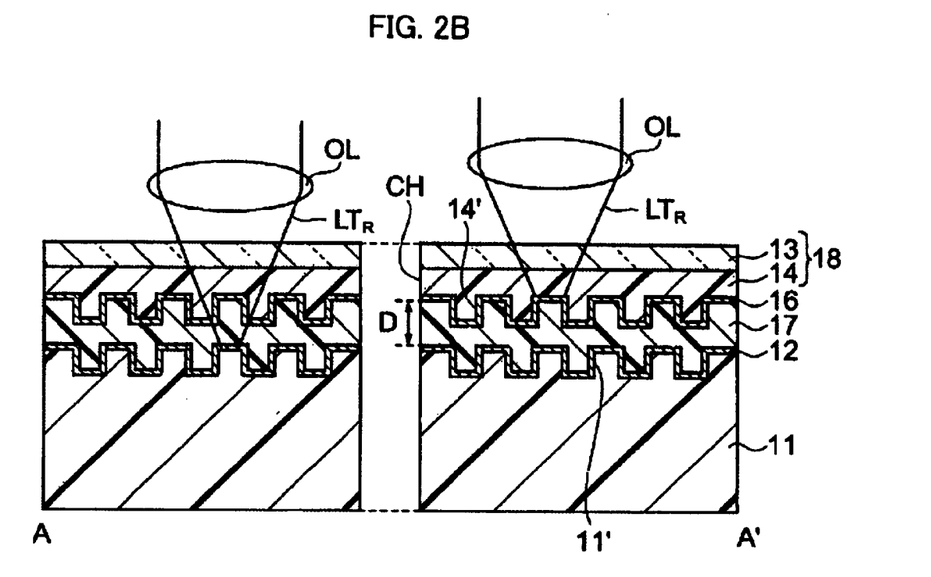
FIG. 2B is a schematic sectional view.

FIG. 2B is a schematic sectional view along the line A–A' in FIG. 2A.

A second optical recording layer 12 is formed on one surface of a disk substrate 11 made of polycarbonate resin etc., for example, having a thickness of 1.1 mm, an outer diameter of 120 mm, and an inner diameter of the center hole CH of 15 mm. On the other hand, a transfer layer 14 made of an ultraviolet curing resin is formed on one surface of a resin film 13, a first optical recording layer 16 is formed on that surface, and the first optical recording layer 16 and the second recording layer 12 are placed together by an interlayer 17 which has a thickness of, for example, 20 μm or so and is transparent to the wavelength of the recording/reproducing light. A light transmitting protective film 18 having a thickness of, for example, 90 μm is composed by combining the transfer layer 14 and the resin film 13.

The second optical recording layer 12 and the first optical recording layer 16 are configured by stacking, from the top layer side, for example, a dielectric film, a recording film made of a phase change type recording material etc., a dielectric film, a reflection film, etc. A recording film of at least the first optical recording layer 16 is configured to include a phase change type recording material.

Here, one surface of the disk substrate 11 is provided with uneven shapes 11'. The second optical recording layer 12 is formed along these uneven shapes. Also, the surface of the transfer layer 14 is provided with uneven shapes 14', while the first optical recording layer 16 is formed along the uneven shapes. The first optical recording layer 16 and the second optical recording layer 12 have uneven shapes caused by the above uneven shapes 14' or the uneven shapes 11' and are sectionalized to track regions, for example, called lands and grooves, by the uneven shapes.

When recording or reproducing the above optical disk, as show in FIG. 1B, laser light or other recording/reproducing light $LT_R$ is irradiated from the objective lens OL from the light transmitting protective film 18 side so as to focus on either of the first optical recording layer 16 and the second optical recording layer 12. At the time of reproducing, return light reflected on either of the first and second optical recording layers (16 and 12) is received and a reproduction signal is taken out.

Also, by making the uneven shapes 11' pits having a length corresponding to the recording data and configuring the optical recording layer by a reflection film such as an aluminum film, the second optical recording layer 12 can also be made a read-only optical recording layer.

Next, an example of a production method of an above optical disk having two optical recording layers will be explained.

Here, an explanation will be given of the case where not only the first optical recording layer 16 but also the second optical recording layer 12 is configured to include a recording film made of a phase change type recording material.

First, a second optical recording layer stamper 10 having uneven shapes 10' comprising patterns for the second optical recording layer on its surface is prepared by a conventional known predetermined method.

Figure 3A:
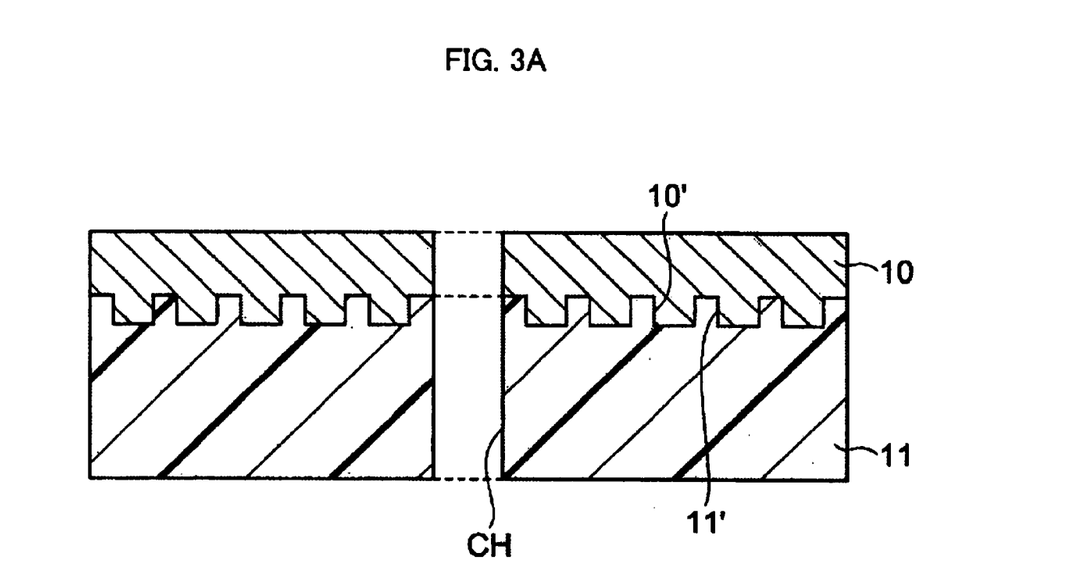
FIG. 3A and FIG. 3B are sectional views of a production process of a production method of an optical disk according to the embodiment.

Next, the above second optical recording layer stamper 10 is arranged so as to face inside a cavity of a mold. A disk substrate 11 made of a polycarbonate resin is produced, for example, by injection molding injecting molten polycarbonate resin as shown in FIG. 3A. At this time, the shape of the center hole CH is formed on the disk substrate 11 by setting the shape of the mold.

Here, the surface of the disk substrate 11 is formed with uneven shapes 11' corresponding to the uneven shapes 10' of the second optical recording layer stamper 10.

Figure 3B:
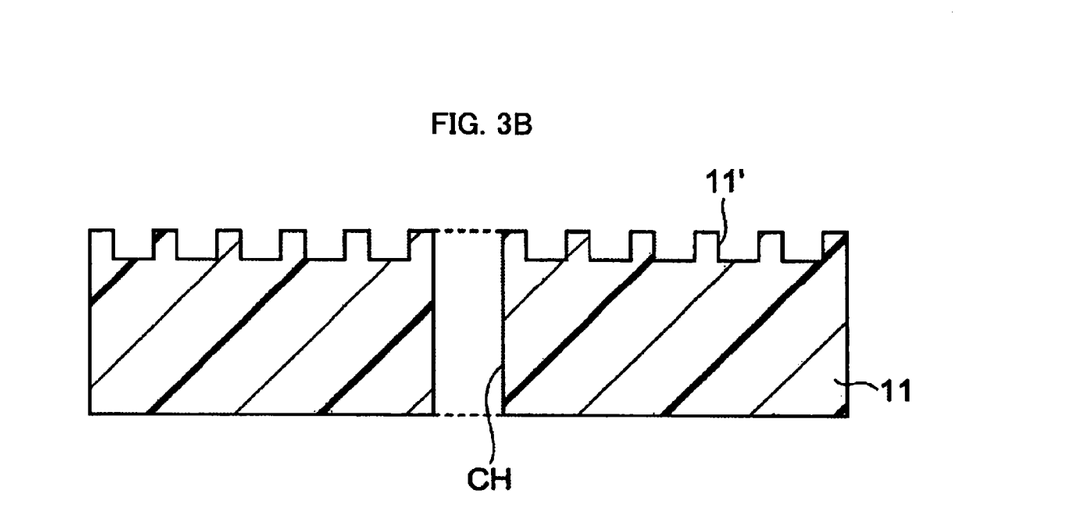

By releasing the product from the second optical recording layer stamper 10, a disk substrate 11 formed with the uneven shapes 11' on its surface as shown in FIG. 3B is obtained.

Figure 4A:
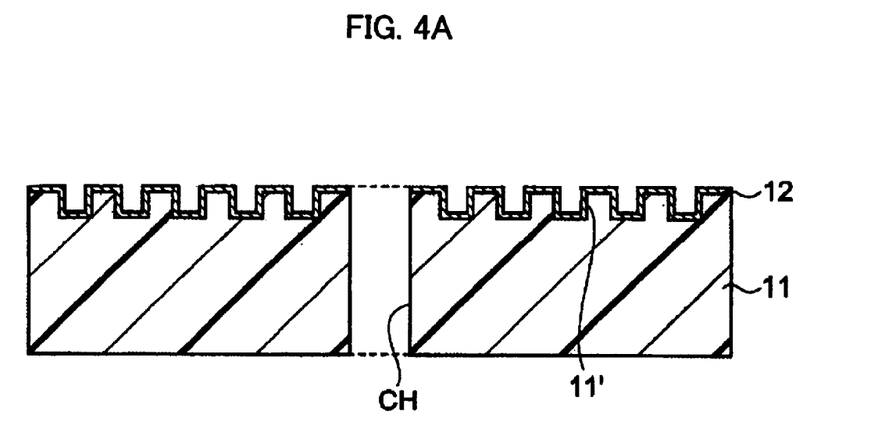
FIG. 4A and FIG. 4B are sectional views of a process continued from FIG. 3B.

Next, as shown in FIG. 4A, a gas such as air or nitrogen gas is blown to the surface of the disk substrate 11 to remove dust, then, for example, sputtering or CVD (chemical vapor deposition) etc. is used to successively stack a total reflecting reflection film made of an aluminum film, a dielectric film, a recording film of a phase change type recording material, and a dielectric film to form the second optical recording layer 12.

Figure 4B:
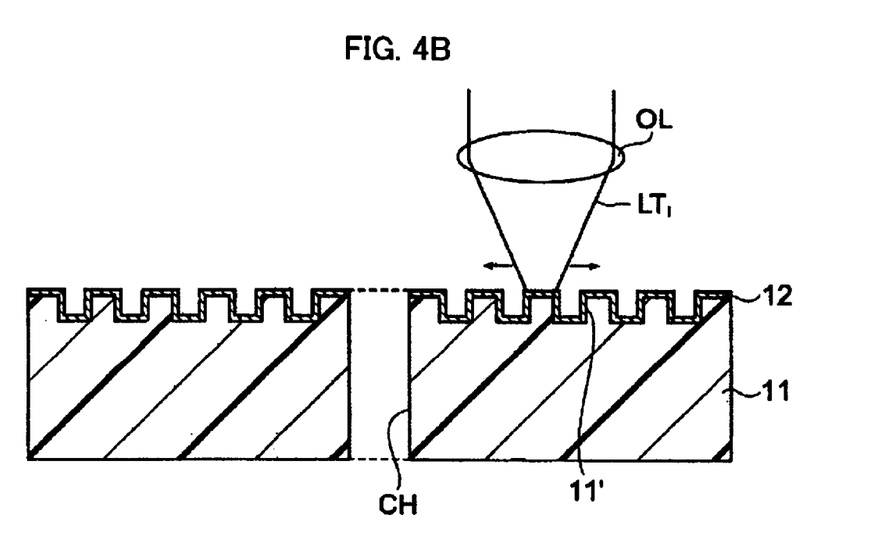

Next, to crystallize the phase change type recording material of the second optical recording layer 12 from a state close to amorphous in the as-deposited" stage after finishing forming the film, as shown in FIG. 4B, the initializing light $LT_I$ is focused by the objective lens OL and irradiated on the second optical recording layer 12 to sweep the entire surface of the second optical recording layer 12 and thereby initialize the second optical recording layer 12.

As the initializing light $LT_I$, for example, an infrared laser, or a laser having a wavelength of less than 400 nm, etc. may be used.

Figure 5A:
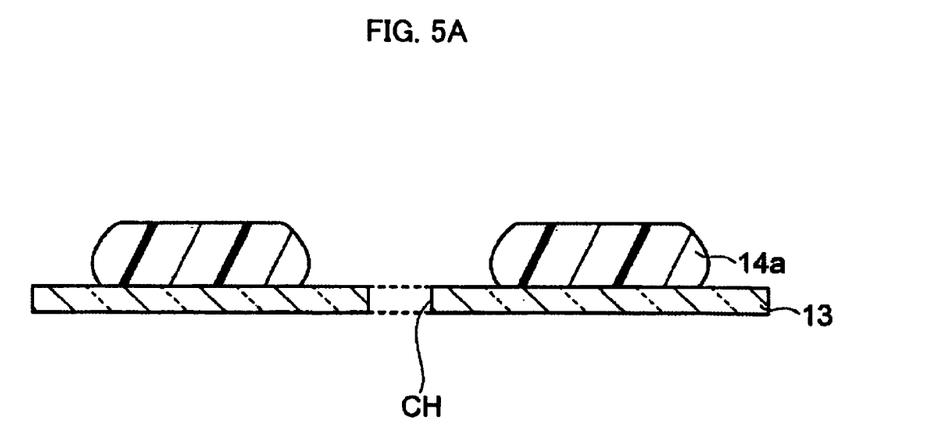
FIG. 5A and FIG. 5B are sectional views of a process continued from FIG. 4B.

On the other hand, as shown in FIG. 5A, a suitable amount of an ultraviolet curing resin 14a for forming a transfer layer is supplied and spin coated on the approximately circular resin film 13, for example, having a thickness of 80 μm and a center hole CH at the center.

Figure 5B:
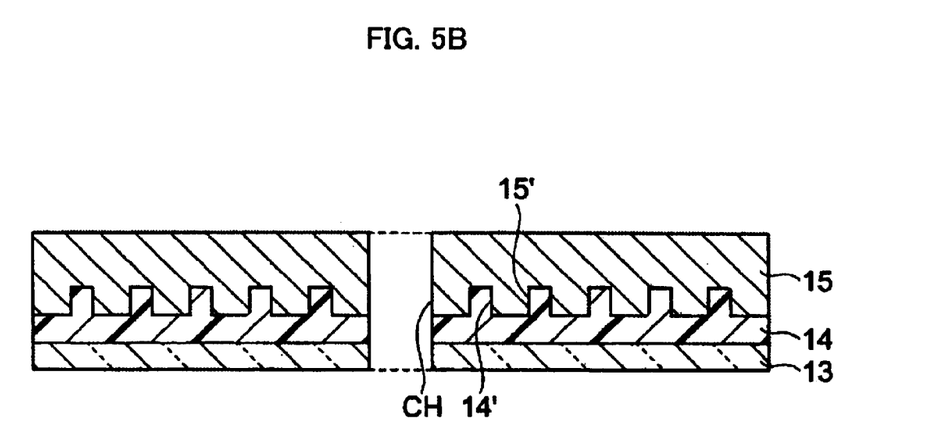

Next, a first optical recording layer stamper 15 having uneven shapes 15' comprising patterns for the first optical recording layer on its surface is formed in advance, then, as shown in FIG. 5B, the first optical recording layer stamper 15 is placed against the ultraviolet curing resin 14a, and a sufficient amount of ultraviolet light is irradiated to cure the ultraviolet curing resin 14a to obtain the transfer layer 14.

Here, uneven shapes 14' corresponding to the uneven shapes 15' of the first optical recording layer stamper 15 are formed on the surface of the transfer layer 14.

Figure 6A:
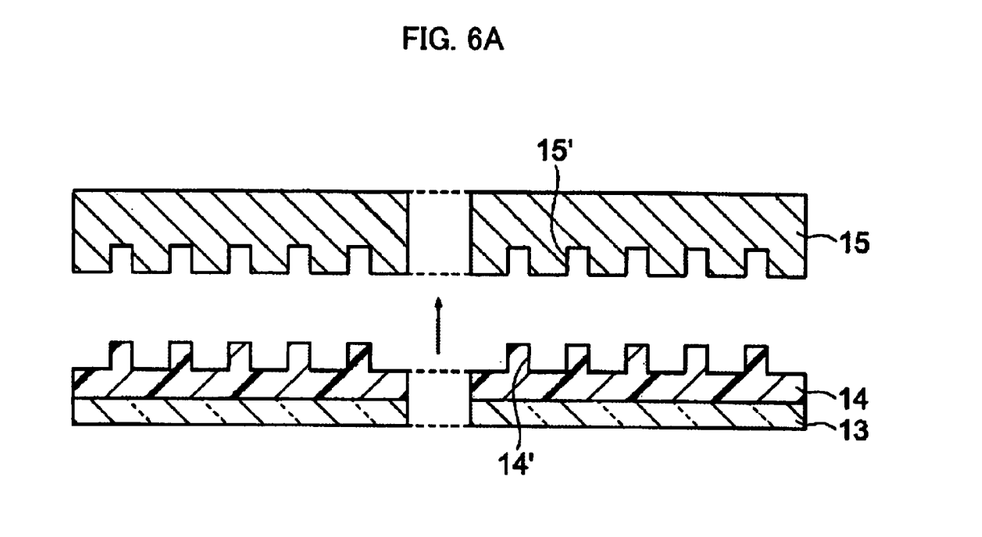
FIG. 6A and FIG. 6B are sectional views of a process continued from FIG. 5B.

Next, as shown in FIG. 6A, the result is released from the first optical recording layer stamper 15 at the boundary with the transfer layer 14 to transfer the uneven shapes 14' to the surface of the transfer layer 14.

Figure 6B:
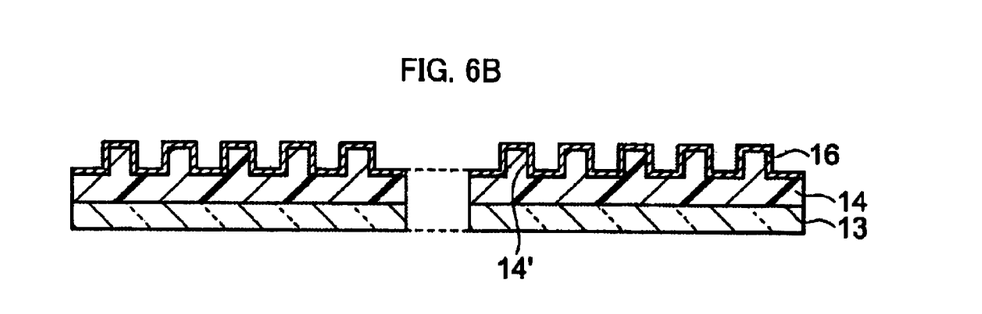

Next, as shown in FIG. 6B, a gas such as air or nitrogen gas is blown to the surface of the transfer layer 14 to remove the dust, then, for example, sputtering, CVD, etc. is used to successively stack a semi-transmitting reflection layer made of an aluminum film, a dielectric film, a recording film of a phase change type recording material, and a dielectric film to form the first optical recording layer 16.

Figure 7A:
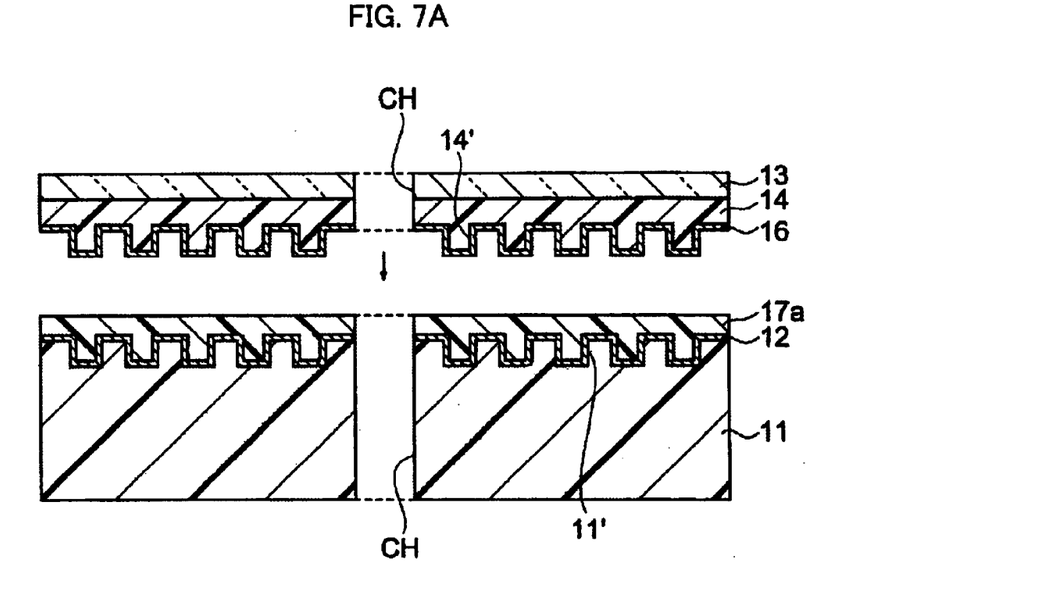
FIG. 7A and FIG. 7B are sectional views of a process continued from FIG. 6B.
Figure 7B:
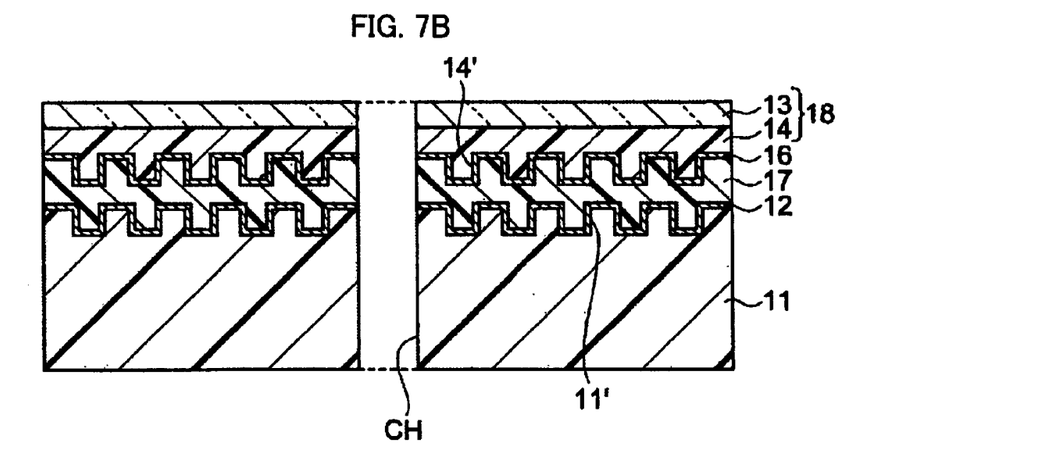

Next, as shown in FIG. 7A, a pressure sensitive adhesive sheet 17a is arranged on the second optical recording layer 12 formed on the disk substrate 11, then, as shown in FIG. 7B, the second optical recording layer 12 and the first optical recording layer 16 are made to face to each other, centered, and bonded using the pressure sensitive adhesive sheet 17a as an interlayer 17 for bonding.

Here, as the material composing the interlayer 17 formed in the above way, a material having a sufficient transmittance for a wavelength of the recording/reproducing light of the optical disk and having absorption for the wavelength of the initializing light in the range of 200 to 400 nm described later is used.

Figure 8:
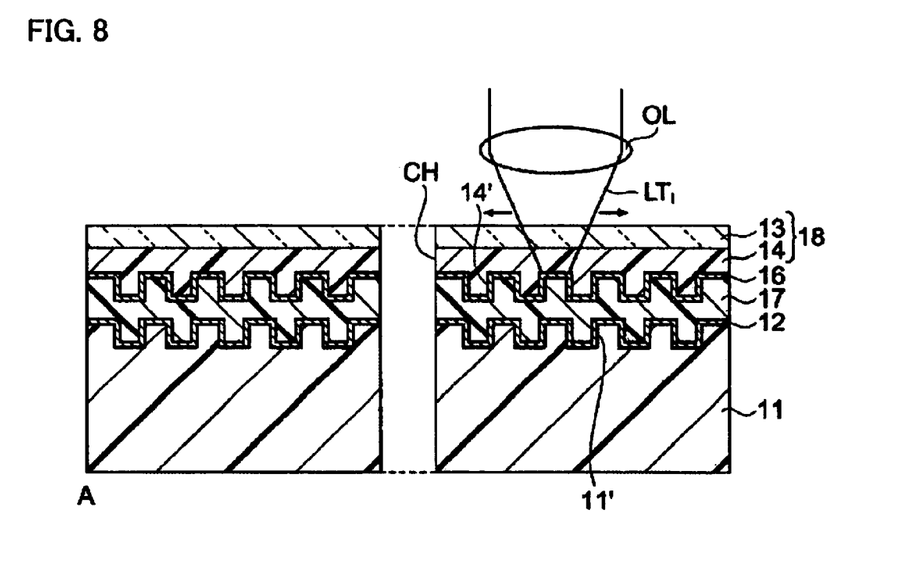
FIG. 8 is a sectional view of a process continued from FIG. 7B.

Next, in the same way as in the second optical recording layer 12, to crystallize the phase change type recording material of the first optical recording layer 16 from a state close to amorphous in the "as-deposited" stage after finishing forming the film, as shown in FIG. 8, the initializing light $LT_I$ is focused by the objective lens OL and irradiated on the first optical recording layer 16 to sweep the entire surface of the first optical recording layer 16 and thereby initialize the first optical recording layer 16.

Here, laser light having a wavelength in the range of 200 to 400 nm is used as the initializing light $LT_I$.

Due to the above, an optical disk configured as shown in FIG. 2 can be produced.

Note that the above production method is one embodiment. Other methods can be used for production such as a method of forming above the second optical recording layer 12 an interlayer 17 having uneven shapes for the first optical recording layer on its surface, forming the first optical recording layer 16 over this, and forming a light transmitting protective film 18 over this. Note that in any case, the first optical recording layer 16 is initialized after stacking it with the second optical recording layer 12 via the interlayer 17 as explained above.

Figure 9:
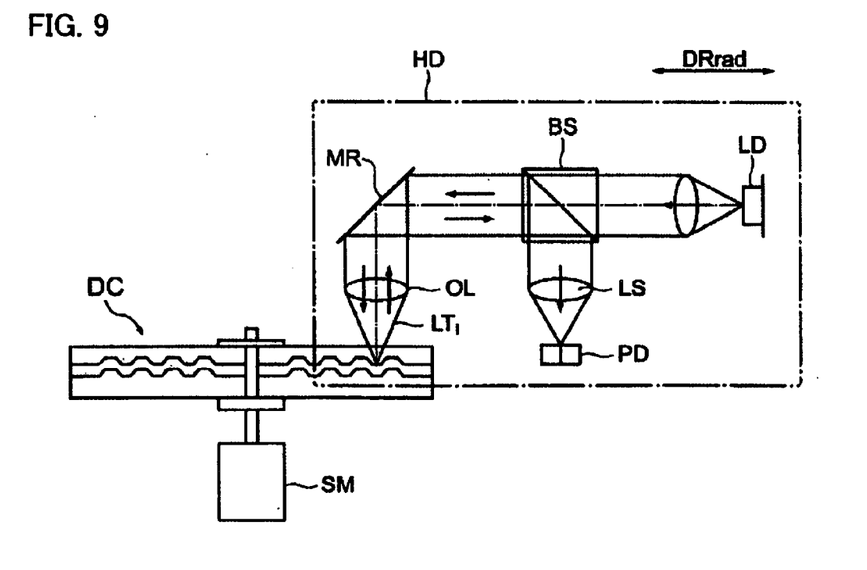
FIG. 9 is a schematic view of the configuration of an initialization apparatus used in the embodiment.

FIG. 9 is a schematic view of an initialization apparatus of optical disk player type used for initializing the above first optical recording layer 16. The apparatus is not limited to the first optical recording layer 16 and can be used in the initialization step of the second optical recording layer 12 shown in FIG. 4B.

The optical disk DC having multi optical recording layers comprised of the first optical recording layer 16 and the second optical recording layer 12 is driven to rotate by a spindle motor SM. The initializing light $LT_I$ is irradiated from an optical head HD movable in the radius direction $DR_{rad}$ of the optical disk with respect to the rotated optical disk DC.

The optical head HD is provided with a laser diode LD as a light source of the initializing light, a beam splitter BS, a reflection mirror MR, and an objective lens OL and is configured so that return light from the optical disk DC is introduced to a photo detector PD by the beam splitter BS and a condensing lens LS and monitored.

The wavelength of the laser diode LD is within the range of 200 to 400 nm and is for example 300 nm. Further, the numerical aperture of the objective lens OL is 0.35.

Figure 10:
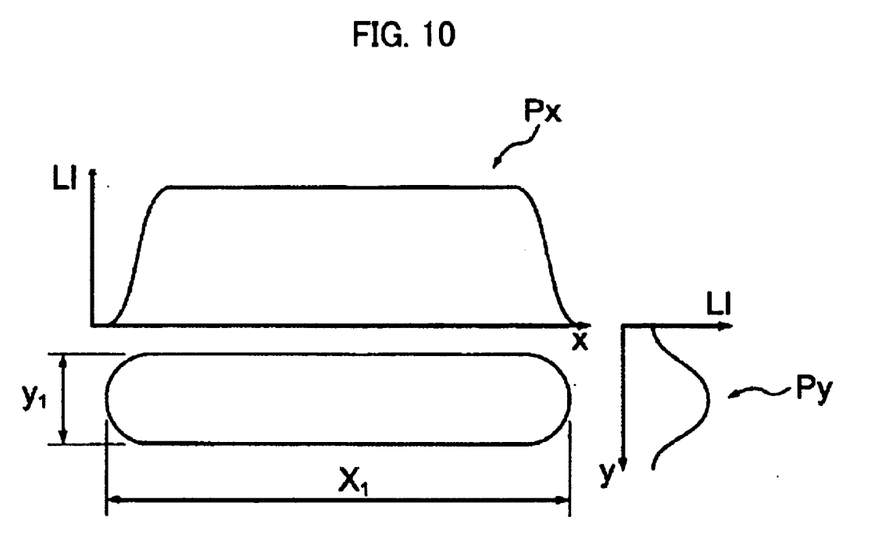
FIG. 10 is a schematic view of a spot shape and a light intensity profile of initializing light used in the embodiment.

A spot shape and light intensity (L1) profile of the initializing light $LT_I$ focused on the first optical recording layer 16 of the optical disk DC by the initialization apparatus is shown in FIG. 10.

The initializing light $LT_1$ has an oval spot shape having a profile Px of a width $x_1$ in the radius direction x of the disk and a profile $P_y$ of a width $y_1$ in the track direction y. The width $x_1$ is made, for example, 50 μm or so as a half width and the width $y_1$ is made, for example, 0.7 μm or so as a half width.

Next, an initialization method of an optical disk having multi optical recording layers by the above initialization apparatus will be explained.

An optical disk is rotated by a suitable speed by a turntable etc. driven by the spindle motor. Laser convergence light serving as the initializing light is focused so that the focal position becomes a position on the recording layer surface to be initialized using a "focus servo" technique.

The laser convergence light moves by a certain distance of, for example, 5 μm, in the radius direction per rotation of the optical disk.

Due to the movement, the entire surface of the information recording/reproducing area RA of the optical disk is initialized.

As will be clear also from the examples described below, in the prior art, while the uneven initialization becomes greater due to the light interference between the first and second recording layers at the time of initialization of the first optical recording layer, according to the initialization method of an optical disk of the above embodiment, by making the material forming the interlayer between the first and second optical recording layers in the optical disk by a material having a sufficient transmittance for the wavelength of the recording/reproducing light and having absorption for the wavelength of the initializing light and by using laser light having a wavelength in the range of 200 nm to 400 nm as the initializing light in the step of initialization by irradiating the initializing light on the first optical recording layer from the protective film side, the problem of the light interference between the first and the second optical recording layers at the time of initialization of the first optical recording layer is sharply reduced and uneven initialization can be suppressed.

[Embodiment]

The results of estimation of the degrees of change in intensity of initializing light by initialization methods of optical disks according to this embodiment and the prior art will be explained.

First, the case, in initialization of the first optical recording layer 16 in an optical disk having multi optical recording layers, where the interlayer 17 has almost no light absorption with respect to both of the wavelength of the initializing light and the wavelength of the recording/reproducing light according to the prior art will be explained.

Figure 11:
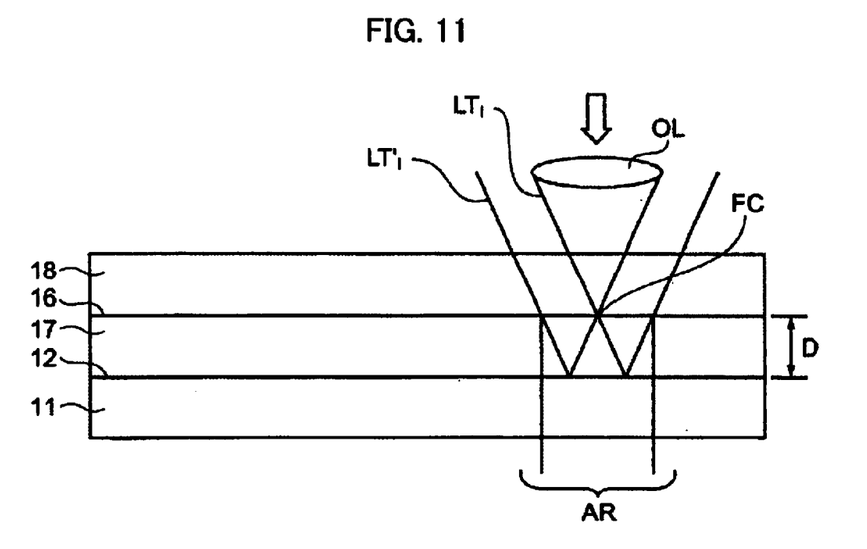
FIG. 11 is a schematic view of an arrangement of the initializing light when initializing a first optical recording layer of the optical disk according to the embodiment.

FIG. 11 shows the arrangement of the initializing light in the case of initializing the first optical recording layer 16 of an optical disk having multi (two) optical recording layers. Note that in FIG. 11, illustration of the guide grooves inherently present on each recording layer is omitted.

Part of the incident light $LT_I$ of the initializing light focused at the focal point FC on the first optical recording layer by the objective lens OL passes through the first recording layer 16 and the interlayer 17, is reflected at the second optical recording layer 12, passes through the interlayer 17 again, and is irradiated to the first recording layer 16 as the return light $LT_I'$. In FIG. 11, the first optical recording layer irradiation area AR of the reflection light on the second optical recording layer is shown.

In this case, the incident light $LT_I$ of the initializing light focused on the first optical recording layer 16 and the return light $LT_I'$ from the second optical recording layer 3 cause light interference on the first optical recording layer 16. If light interference occurs, the intensity of the laser light on the first recording layer 16 fluctuates as compared with the case where there is no reflection light from the second recording layer 12. The amount of the fluctuation changes with respect to the thickness D of the interlayer 17.

The intensity of the laser light on the first optical recording layer 16 changes due to the light interference cyclically with respect to changes in the thickness D of the interlayer 17. If the refractive index of the interlayer 17 for the wavelength $\lambda_I$ of the initializing light is $n_I$, the fluctuation of the intensity of the laser light on the first optical recording layer 16 occurs by a period of $\lambda_I/(2n_I)$ according to the increase of the thickness D of the interlayer 17.

For example, if the wavelength $\lambda_I$ of the initializing light is 350 nm and the refractive index $n_I$ of the interlayer 17 is 1.5, the intensity of light on the first recording layer 16 repeatedly rises and falls every 0.12 μm fluctuation of the thickness D of the interlayer 17.

For example, if the thickness D of the interlayer 17 were 20 μm, the thickness error of the interlayer 17 would have to be controlled to not more than 0.01 μm, but this is impossible in practice. In actuality, here is a thickness error of more than 1 μm in the disk surface. Therefore, the degree of light interference in the disk surface cannot be kept constant.

Figure 12:
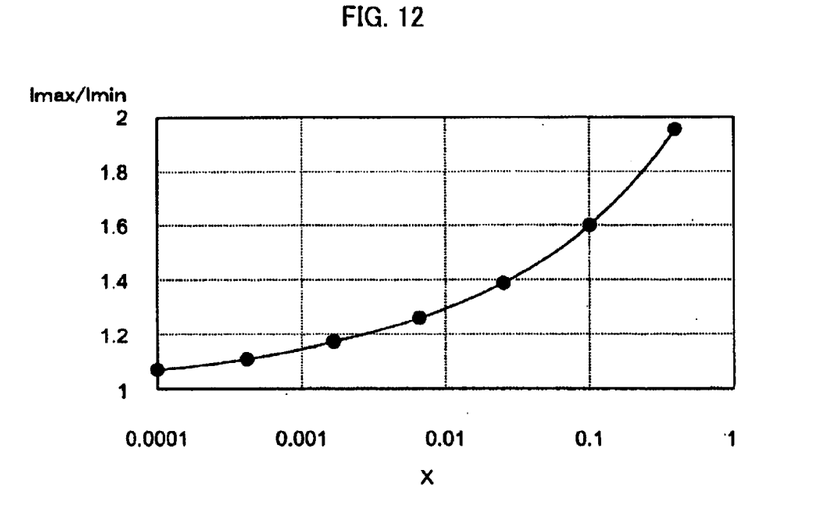
FIG. 12 is a view of the result of estimating a degree of change of intensity of the initializing light in the embodiment.

The results of estimating the intensity change degree of the initializing light on the first optical recording layer 16 generated by light interference in the case of initializing an optical disk having multi optical recording layers, wherein a thickness and reflection of the interlayer 17 are 20 μm and 1.5 respectively, by an initialization apparatus having a specific configuration of a wavelength of the initializing laser light of 300 nm, a numerical aperture of the objective lens of 0.35, a half width in the radius direction of the spot shape of the initializing laser light at a focal position of 50 μm, and a half width thereof in the track direction is 0.7 μm will be explained with reference to FIG. 12.

In FIG. 12, the abscissa X indicates a value expressed by the formula (1) below, wherein the transmittance of the first optical recording layer 16 is $T_{16}$, the transmittance of the interlayer 17 is $T_{17}$ (=1- absorbance $A_{17}$ of interlayer), and the reflectance of the second optical recording layer 12 is $R_{12}$:

$$X = T_{16}^2 \times T_{17}^2 \times R_{12} \quad (1)$$

The ordinate indicates the degree of change in intensity of the initializing light on the first optical recording layer 16 and is a value expressed by $I_{max}/I_{min}$, wherein $I_{max}$ is the intensity in the case of mutual strengthening of the results of the interference and $I_{min}$ is the intensity in the case of mutual weakening.

In the case of initializing the first optical recording layer 16 of an optical disk having optical recording layers wherein the transmittance of the first optical recording layer 16 with respect to the wavelength of the initializing light $LT_I$ is 50%, the reflectance of the second optical recording layer 12 is 50%, the transmittance of the interlayer 17 is 100%, the refractive index is 1.5, and the thickness is 20 μm, by using an initializing apparatus having a configuration wherein a wavelength of the initializing laser light is 300 nm, the numerical aperture of the objective lens is 0.35, the half width in the radius direction of the spot shape of the initializing laser light at a focal position is 50 μm, and the half width thereof in the track direction is 0.7 μm, the degree of change of the intensity of the initializing light $LT_I$ on the first optical recording layer 16 is about 1.6 since X=0.125 calculated from $T_{16}$=0.5 (50%), $T_{17}$=1 (100%), and $R_{12}$=0.5 (50%). That is, the light intensity of the initializing light on the first optical recording layer 16 has a fluctuation of ±30% or so based on the intermediate point between $I_{max}$ and $I_{min}$. Uneven initialization due to the light interference caused at the time of initialization cannot be reduced.

On the other hand, in the initialization of the first optical recording layer 16 in the optical disk having multi optical recording layers, the case where the interlayer 17 according to the embodiment of the present invention has absorption for the wavelength of the initializing light and has almost no light absorption for the wavelength of the recording/reproducing light will be explained.

For example, there are many materials having absorption in the wavelength range of 200 to 400 nm among organic materials transparent in the visible light range.

Figure 13:
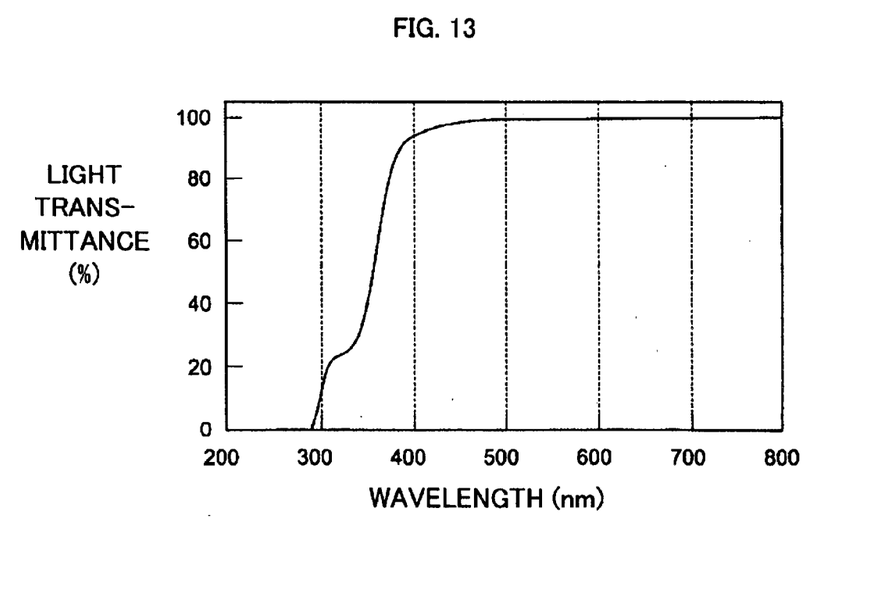
FIG. 13 shows a transmittance spectrum of the material of the interlayer in the embodiment.

FIG. 13 shows a transmittance spectrum at a thickness of 20 μm of an organic material Z transparent in the visible range which can be used as an interlayer. As a definition of the transmittance used here, if the ratio of the light energy absorbed by the material Z while light travels 20 μm in the material Z is $A_I$, the transmittance $T_I$ is made $1-A_I$.

Needless to say, there are materials having absorption in the wavelength range of 200 to 400 nm other than the above material Z.

The above material Z has a light transmittance of about 10% per thickness of 20 μm at the wavelength of 300 nm.

In the case of initializing the first optical recording layer 16 of an optical disk wherein the transmittance of the first optical recording layer 16 with respect to the wavelength of the initializing light $LT_I$ is 50%, the reflectance of the second optical recording layer 12 is 50%, the transmittance of the interlayer 17 using the above material Z as the material is 10%, the refractive index is 1.5, and the thickness is 20 μm by using an initializing apparatus having a configuration wherein a wavelength of the initializing laser light is 300 nm, the numerical aperture of the objective lens is 0.35, the half width in the radius direction of the spot shape of the initializing laser light at a focal position is 50 μm, and the half width thereof in the track direction is 0.7 μm, the degree of change of the intensity of the initializing light $LT_I$ on the first optical recording layer 16 is about $I_{max}/I_{min}$=1.2 since X=0.00125 calculated from $T_{16}$=0.5 (50%), $T_{17}$=1 (10%), and $R_{12}$=0.5 (50%). That is, the light intensity of the initializing light on the first optical recording layer 16 has a fluctuation of ±10% or so based on the intermediate point between $I_{max}$ and $I_{min}$. The problem of the light interference between the first and second optical recording layers at the time of initialization is extremely reduced and uneven initialization is able to be suppressed comparing the case that the interlayer 17 has scarcely any light absorption for both of the wavelength of the initializing light and the wavelength of the recording/reproducing light described above.

Figure 14:
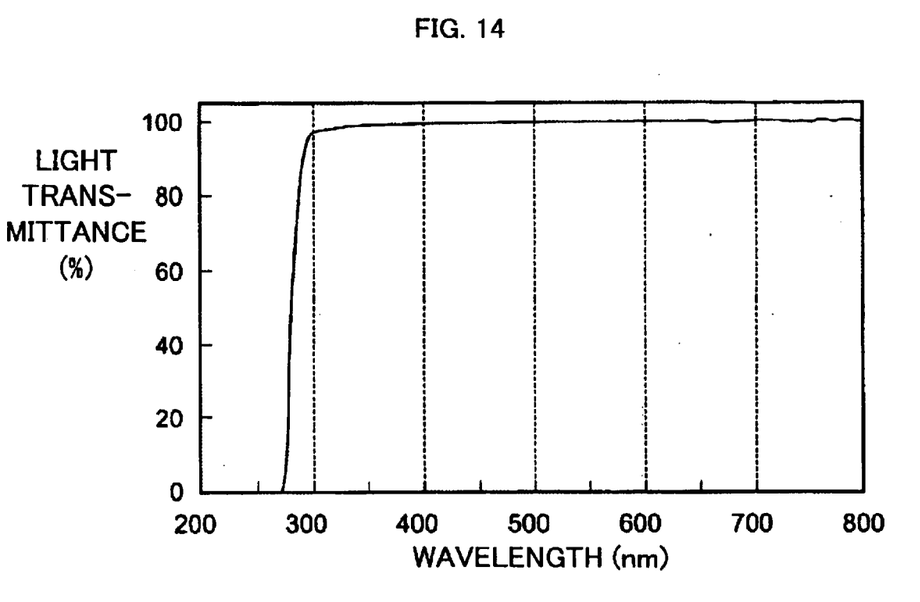
FIG. 14 shows a transmittance spectrum of the material of the interlayer in the embodiment.

FIG. 14 shows a transmittance spectrum at a thickness of 20 μm of a polycarbonate resin capable of being used as an organic material transparent in the visible range where it can be used as an interlayer.

A polycarbonate resin has a light transmittance of about 4% per 20 μm thickness at the wavelength of 275 nm. Therefore, in the case of using an optical disk having a transmittance of the first optical recording layer 16 of 50% with respect to the wavelength of the initializing light $LT_I$, a reflectance of the second optical recording layer 12 of 50%, and a transmittance of 4%, a refractive index of 1.5, and a thickness of 20 μm of the interlayer 17 using the polycarbonate resin for the material, the value of X becomes 0.0002, $I_{max}/I_{min}$ becomes about 1.1 from FIG. 12, the degree of the light interference between the first and second optical recording layers at the time of initialization is sharply reduced, and uneven initialization can be suppressed.

It is preferable to use a watt class large power laser for the laser light source used for the initialization. By combining watt class large power lasers, it is possible to initialize a disk efficiently.

Examples of watt class lasers having a wavelength of 200 to 400 nm capable of being used as the initializing light in the present embodiment are shown in Table 1. Table 1 shows data of Ar lasers (Coherent Co., Innova sabre).

TABLE 1

Types of Gas Lasers

| Wavelength (nm) | Oscillation mode | Output (W) |
|---|---|---|
| 351 | Single | 1.7 |
| 334.5 | Single | 0.5 |
| 302.4 | Single | 0.38 |
| 275.4 | Single | 0.35 |
| 333–363.8 | Multi | 7 |
| 300–336 | Multi | 3 |
| 275–306 | Multi | 1.6 |

As shown in Table 1, there is a broad selection of watt class lasers having wavelength regions of 200 to 400 nm.

Therefore, it is possible to optimize the combination of the laser light source and the material for the interlayer 17 commensurate with it.

As described above, in the case of initialization of the first optical recording layer of an optical disk having multi optical recording layers, the uneven initialization due to the light interference caused at the time of initialization is able to be reduced without deterioration of the information recording/reproducing properties.

According to the present embodiment, at the time of initializing an optical disk having multi optical recording layers including two or more optical recording layers of the rewritable type or the write-once type among phase change type optical disks, by using a laser having a wavelength between 200 to 400 nm as the laser in the initialization and using a material having a sufficiently low light transmittance with respect to the wavelength of the above laser and a sufficiently high light transmittance with respect to the wavelength of the wavelength of the laser used for recording/reproducing of the optical disk as a material of the interlayer, the degree of change of the light intensity on the initializing surface caused by light interference between optical recording layers is reduced, so uneven initialization is suppressed and good initialization can be performed.

The present invention is not limited to the above embodiments.

For example, the disk structure to be initialized is not limited to the structure shown in FIG. 2. Initialization may be performed in the state where there is no light transmitting protective film 18 formed on the first optical recording layer 16 in the structure of FIG. 2.

Other than the above, a variety of modifications may be made within the scope of the present invention.

According to the present invention, at the time of initializing an optical recording medium having a phase change type optical recording layer, it is possible to reduce uneven initialization due to the light interference occurring at the time of initialization without deterioration of the information recording/reproducing signal characteristics of the recording layers.

INDUSTRIAL APPLICABILITY

The present invention can be used for an initialization method of an optical disk used in a method of production of an optical disk capable of dealing with rewritable types and other types of memories having an optical recording layer using a phase change type material as a recording material and enabling realization of inexpensive large-capacity files.

What is claimed is:

1. An initialization method of an optical recording medium wherein a second optical recording layer and first optical recording layer are successively stacked on a substrate through an interlayer, a protective layer is formed over the first optical recording layer, a recording film of at least the first optical recording layer has a phase change type recording medium, and recording/reproducing light is irradiated from the protective layer side at the time of recording/reproduction, wherein the material forming the interlayer has a sufficient transmittance with respect to a wavelength of the recording/reproducing light and has an absorption with respect to a wavelength of the initializing light and wherein, in a step of initialization by irradiating initializing light to the first optical recording layer from the protective film side, laser light having a wavelength range of 200 nm to 400 nm is used as the initializing light.

2. An initialization method of an optical recording medium as set forth in claim 1, wherein:

the initializing light is from an Ar gas laser having a wavelength in the range of 200 nm to 400 nm, and the material composing the interlayer is an organic material.

3. An initialization method of an optical recording medium as set forth in claim 1, wherein:

the initializing light is from an Ar gas laser having a wavelength in the range from 200 nm to 400 nm, and the material composing the interlayer is a polycarbonate resin.

* * * * *